US012298891B2

(12) United States Patent
Hoole et al.

(10) Patent No.: US 12,298,891 B2
(45) Date of Patent: May 13, 2025

(54) MACHINE-BASED SOURCE CODE ASSESSMENT

(71) Applicant: MICRO FOCUS LLC, Santa Clara, CA (US)

(72) Inventors: Alexander Hoole, Vancouver (CA); James Wesley Rabon, Montgomery, AL (US); Peter Thomas Blay, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 252 days.

(21) Appl. No.: 17/716,869

(22) Filed: Apr. 8, 2022

(65) Prior Publication Data

US 2023/0325306 A1 Oct. 12, 2023

(51) Int. Cl.
*G06F 11/36* (2006.01)
*G06F 11/3668* (2025.01)
*G06N 3/08* (2023.01)

(52) U.S. Cl.
CPC ...... *G06F 11/3688* (2013.01); *G06F 11/3696* (2013.01); *G06N 3/08* (2013.01)

(58) Field of Classification Search
CPC .... G06F 11/3688; G06F 11/3696; G06N 3/08
USPC ........................................................ 717/124
See application file for complete search history.

(56) References Cited

U.S. PATENT DOCUMENTS

| 8,990,783 | B1 * | 3/2015 | Yu | .............................. | G06F 9/30 |
| | | | | | 703/22 |
| 10,783,062 | B2 | 9/2020 | Rutten | | |
| 11,055,209 | B2 | 7/2021 | Hu | | |
| 11,144,359 | B1 * | 10/2021 | Brooker | ................... | G06F 21/53 |
| 2011/0016356 | A1 * | 1/2011 | Artzi | ..................... | G06F 11/3612 |
| | | | | | 714/E11.217 |
| 2014/0380281 | A1 * | 12/2014 | McLaughlin | ........ | G06F 11/3688 |
| | | | | | 717/127 |
| 2015/0378875 | A1 * | 12/2015 | Sivanesan | ............ | G06F 11/3684 |
| | | | | | 717/124 |
| 2017/0249240 | A1 * | 8/2017 | Splichal | .............. | G06F 11/3672 |
| 2019/0129833 | A1 * | 5/2019 | Lv | ......................... | G06F 11/3664 |
| 2023/0009997 | A1 * | 1/2023 | Bregman | ............. | G06F 11/3688 |

* cited by examiner

*Primary Examiner* — Thuy Dao
*Assistant Examiner* — Zengpu We
(74) *Attorney, Agent, or Firm* — Sheridan Ross P.C.

(57) ABSTRACT

Systems and methods are disclosed for configuring a testing device to only perform relevant tests, wherein the test results are more meaningful (e.g., few false-positives) and relevant to the application. Source code is analyzed to determine elements that indicate a particular environment for the source code's corresponding machine code. When the source code indicates that a particular environment is not a candidate for execution of the machine code, tests associated with that particular environment are excluded. The testing device is then configured to perform those tests that are relevant for those environments that actually apply.

20 Claims, 8 Drawing Sheets

MACHINE-BASED SOURCE CODE ASSESSMENT

FIELD OF THE DISCLOSURE

The invention relates generally to systems and methods for configuring a testing machine and particularly to the configuration of a testing machine.

BACKGROUND

The need to ensure computer applications are safe is an ever-increasing priority. Software engineers may be unaware of the impact their application may have in the hands of a nefarious actor. For example, a command in an application code, such as JavaScript call contained within a Hypertext Markup Language (HTML) may work as intended but can be modified to perform unintended actions, such as to obtain access to sensitive data or cause a host computer to perform an undesirable action.

In response, code is often analyzed to determine whether errors/flaws/weaknesses, vulnerabilities, or other anomalies are present. This may comprise static and/or dynamic analysis. Static analysis is the testing and evaluation of an application by examining the application's source code without executing the application, such as to match a pattern of a portion of the source code to a reference code. If the reference code is known to be problematic, the associated portion of the source code is identified as being similarly problematic. Dynamic analysis is the testing and evaluation of the application during runtime, such as to provide the application with inputs and observing the outputs.

Dynamic analysis may include "fuzzing" (e.g., sending random data to an input), runtime instrumentation, and application scanning to detect many software defects that cause memory errors or threading errors (e.g., deadlocks, etc.). Static and dynamic analysis are complementary because no single approach is likely to find every error or vulnerability. For example, dynamic analysis often reveals subtle defects or vulnerabilities whose cause is too complex to be discovered by static analysis. Static analysis can be used to examine some or all execution paths and variable values, not just those that are invoked during execution. Thus static analysis can reveal errors that may not manifest themselves until later, such as after being released to users.

While static and dynamic analysis are effective in identifying many defects, errors, and vulnerabilities, each can generate a substantial amount of scan "noise" in the scan results due to findings that are not relevant to the application under test.

SUMMARY

Static and dynamic code scanning can provide results containing a large amount of scan "noise" arising from findings that are not relevant to the particular application under tests. Scan noise can complicate results analysis and response by reviewers. Scan noise differs from false positives in that a particular defect exists, whereas a false positive there is no underlying defect despite being identified as such. The scan noise is the result of a particular defect, error, vulnerability, etc. (collectively, "defect") being irrelevant, impossible, or otherwise not applicable to the specific application under test.

A taint flag identifies different ways that input can be controlled or where taint may be derived from. The results from taint checking of source code to identify data that may be "tainted" by a user-controlled input renders a set of possible errors or vulnerabilities. If used maliciously, a variable may comprise data used to formulate an SQL injection attack or buffer overflow attack. If a second variable is determined, in whole or in part, by the first variable, then the second variable may also be tainted and be corrupt or cause a host server to execute an unintentional command.

In one embodiment, different types of vulnerability categories (e.g. cross-site scripting (XSS), command injection, etc.) or taint flags, which correspond to different elements in the code and other identifying features, are identified as being relevant to different types of applications (e.g., a mobile application, web application, GUI application, web API, thick client, daemon application, library, etc.). The application type is used to filter vulnerabilities, such as issues related to metadata (e.g., vulnerability/weakness category types, taint flags, or other identifiable features) in order to remove the scan noise (e.g., flags that are not relevant given the type of application), based on application genealogy, to provide the subset of issues that are likely relevant to the target audience. An application or project source tree (e.g., application genealogy) is/are analyzed to determine a type of a selected application. In one embodiment, a user manually selects, for each application, a type of application based on the analysis results. In another embodiment, the type of application may be discovered by automated processes.

As a history of user preferences and behaviors is constructed, a heuristic/machine learning/artificial intelligence module can be applied to the history to enable automatic categorization of an application. A machine learning/artificial intelligence module can also be used to learn what is relevant for application type based on human auditing, e.g., based on common factors and parameters shared by previously similarly manually categorized applications. Following manual or automatic categorization, the system scans an application of a given application type, filters out irrelevant flags based on the given application type, and displays the filtered results or flags. Application type filter policies define what taint flags, associated categories, and other identifiable features are relevant for a given type of application.

These and other needs are addressed by the various embodiments and configurations of the present invention. The present invention can provide a number of advantages depending on the particular configuration. These and other advantages will be apparent from the disclosure of the invention(s) contained herein.

In one embodiment, a computer-implemented method of training a dynamic application testing component is disclosed, comprising: accessing an application under test (AUT) identifying a set of available tests associated with the AUT, wherein each test, of the set of available tests, corresponds to at least one executable environment; analyzing a source code corresponding to the AUT to determine at least one target executable environment of the AUT; determining an exclusion category comprising tests, of the set of available tests, that comprise a corresponding at least one executable environment that excludes the at least one target executable environment; and configuring the dynamic application testing component to test the AUT comprising tests selected from the set of available tests excluding tests that are determined to be members of the exclusion category.

In another embodiment, a system for training a dynamic application testing component is disclosed, comprising: a processor comprising at least one microprocessor having instructions maintained in a non-transitory medium that cause the processor to: identify, from a data structure, a set of available tests associated with the AUT, wherein each test, of the set of available tests, corresponds to at least one executable environment; analyzing a source code corresponding to the AUT to determine at least one target executable environment of the AUT; determining an exclusion category comprising tests of the set of available tests that comprise a corresponding at least one executable environment that excludes the at least one target executable environment; and configuring the dynamic application testing component to test the AUT comprising tests selected from the set of available tests excluding tests that are determined to be members of the exclusion category.

In another environment, a system is disclosed, comprising: means to identify, from a data structure in a data storage, a set of available tests associated with the AUT, wherein each test, of the set of available tests, corresponds to at least one executable environment; means to automatically analyze a source code corresponding to the AUT to determine at least one target executable environment of the AUT; means to determine an exclusion category comprising tests, of the set of available tests, that comprise a corresponding at least one executable environment that excludes at least one target executable environment; and means to configure a dynamic application testing component to test the AUT comprising tests selected from the set of available tests excluding tests that are determined to be members of the exclusion category.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference to one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
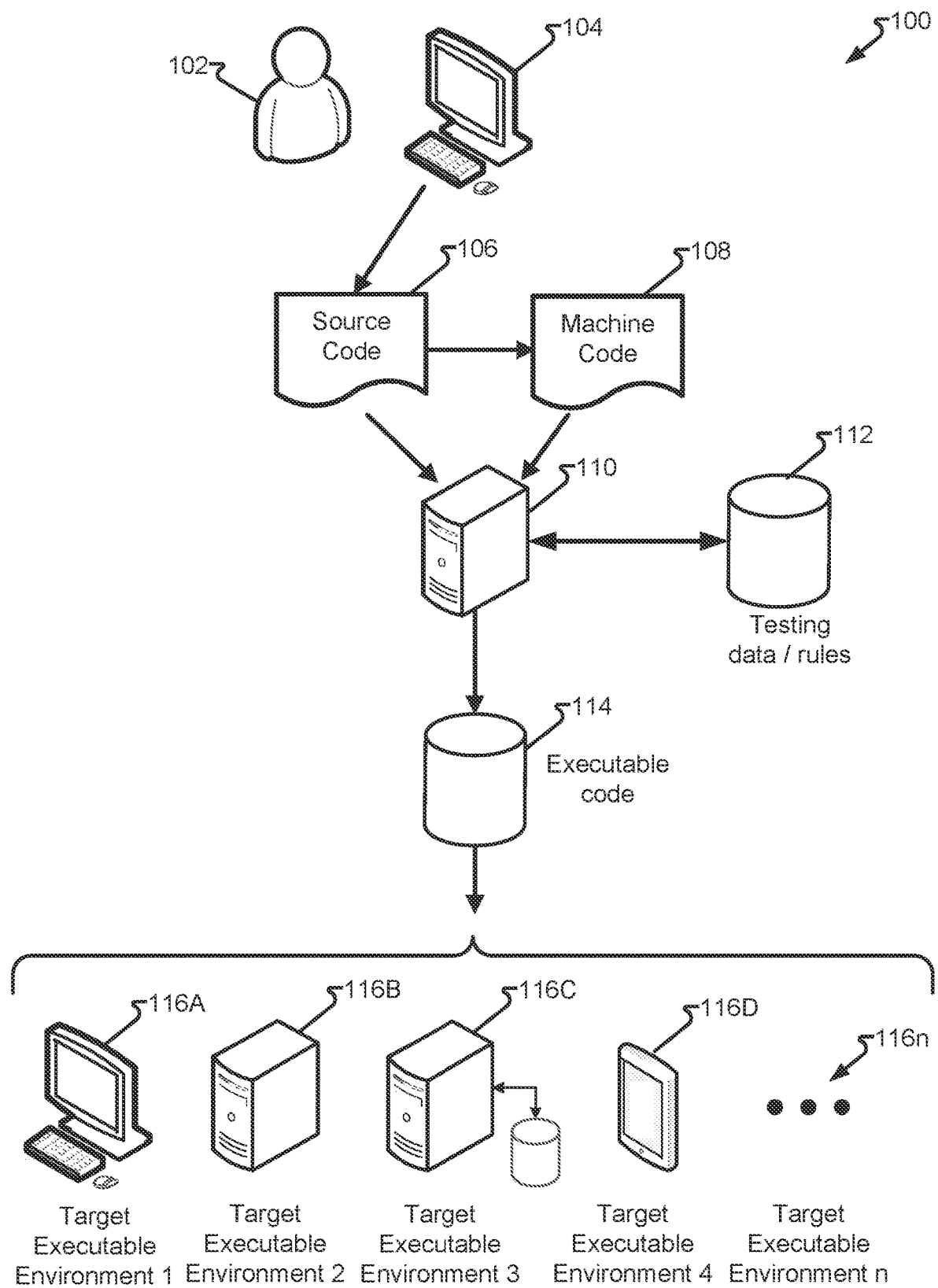
FIG. 1 depicts a first system in accordance with embodiments of the present disclosure.

FIG. 1 depicts system 100 in accordance with embodiments of the present disclosure. In one embodiment, system 100 illustrates the development of machine-executable instructions for execution on a number of executable environments 116. Programmer 102 provides at least a portion some or all instructions as source code 106, such as input into programmer device 104 for storage and/or processing, such as by a software development kit, editor, etc. Generally, source code 106 encompasses one or more data structures and algorithms, commonly maintained as a file, having commands in accordance with a syntax defined by a particular programming language. As a result, source code 106 comprises commands, functions, data structures, and/or other operations in a quasi-human/quasi-machine language. However, source code 106 is unable to be executed directly by a processor without first being converted into machine-readable instructions for execution by a processor, such as a processor's instruction set, via processing by a complier or interpreter and optionally a linker utilized to include previously complied libraries, and thereby generate machine code 108.

Software, even when wrote to exactly perform the operations intended, may include errors or vulnerabilities that may be exploited by a nefarious actor. For example, executing machine code 108 may include receiving an input from a user, such as a password. The received value is then evaluated according to the programming. However, if an unintentionally large value is provided, a buffer overflow may occur which writes a portion of the input into memory space outside of the memory space allocated for the input. This may result in a system receiving a password and, even though the password is unauthorized, the data wrote into the adjacent memory causes the system to grant access. A buffer overflow error is one type of error that is more susceptible in some environments, such as those executing thick clients (e.g., ".exe", ".dll" or other executable files generated by C or C++) and less susceptible in other environments, such as those executing Java applications.

Computer 110 may be configured as a testing platform, which may comprise a single processor up to and including a plurality of servers and/or processors. Computer 110 may access test data storage 112 comprising tests, testing data, and/or storing test results. Test data storage 112 may similarly be embodied as a single data storage device to a plurality of devices. Prior art systems would determine which tests to apply to source code 106 or machine code 108 solely from the tests determined from test data storage 112. Performing every test available is one technique to determine how an application will perform once made available to end users, which may include nefarious users. However, when the resulting application is not able to be executed on every platform available, performing every available test available unnecessarily wastes computational resources of computer 110 and burdens test data storage 112 with tests results from irrelevant tests. Accordingly, and in one embodiment, systems and methods are provided to configure computer 110 to exclude the testing of machine code 108, or source code 106, with tests that are determined to be irrelevant based on unobtainable, or unnecessary, target computing environments which are further determined by analysis of source code 106. An application, exhibiting a specific set of properties or coding constructs, which implies a computing environment(s), then tests targeted to environments, other than that those which have been implied, are deemed unnecessary for the purpose of evaluating the AUT for errors or vulnerabilities.

As a result, executable storage 114 may maintain executable code, source code, and/or tests for deployment in target executable environment 116. As used herein, an "executable environment" includes any intended or actual computational environment for execution of machine code 108, which may be packaged as an application, as determined by one or more of operating system (e.g., Windows, Linux, iOS, etc.), processor (e.g., Intel chipsets, Motorola chipsets, Apple etc.), and/or architecture (e.g., client of a client-server application, server of a client-server application, stand-alone PC application, stand-alone mobile application, browser-based application, application interacting with a database, etc.). Additionally or alternatively, an "executable environment" may include or exclude a specific version of any of the foregoing, such as a particular version(s) of the Windows operating system that do, and/or do not, have the functionality to execute the target application, such as machine code 108.

As a benefit of the systems and methods described herein, computer 110 is configured with a filtered set of all available tests, determined by portions of source code 106, to reduce or eliminate the performance of tests that are not applicable to target executable environment(s) 116 for which machine code 108 cannot successfully be executed. Even when computer 110 is deployed as a powerful array of computing devices, testing is routinely limited by time. By excluding tests determined to be nonapplicable to those target executable environment(s) 116 which can execute machine code 108, time that is available to test machine code 108, can be focused on those tests that may actually reveal errors and vulnerabilities that could be encountered. As a further benefit, errors or vulnerabilities that may be discovered by computer 110 testing machine code 108 (or source code 106), but which cannot be realized due to a dependency on a particular target executable environment(s) 116 that will not be available or is not relevant to execute an application comprising machine code 108 or is unnecessary for the source code of 106 and, such tests and their results (i.e., false-positives), can be reduced or eliminated.

Figure 2:
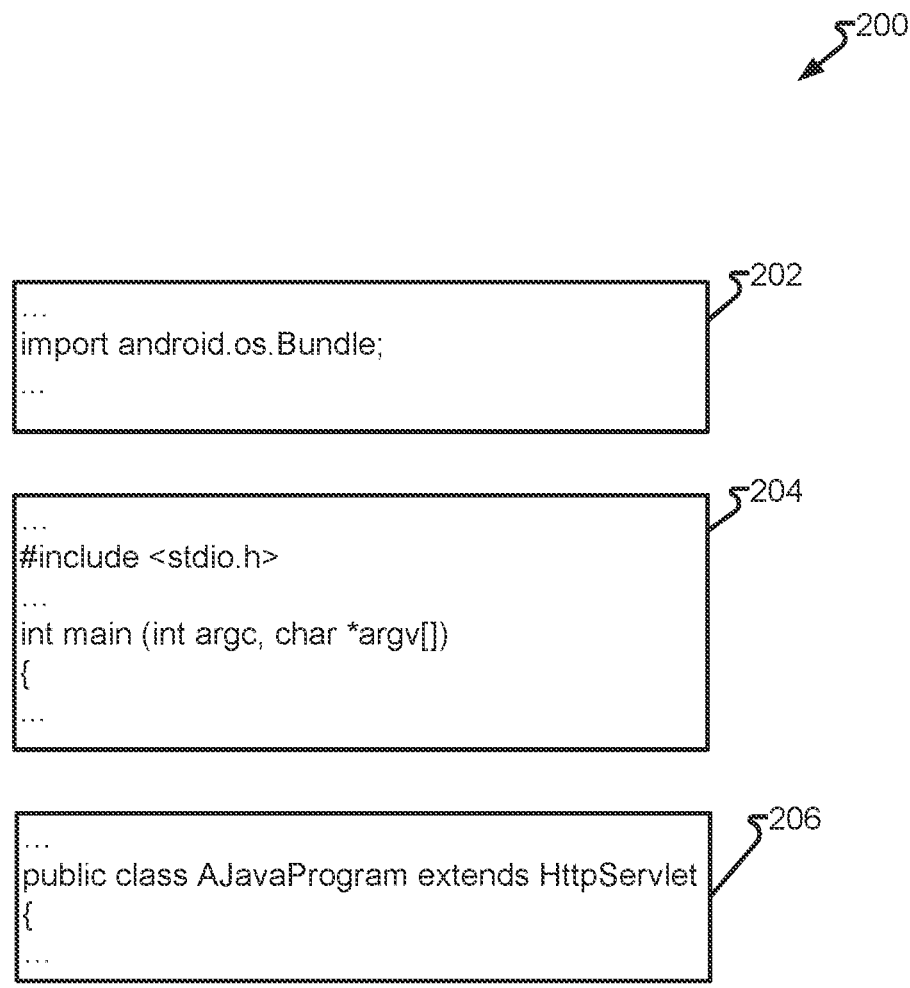
FIG. 2 depicts source code portions in accordance with embodiments of the present disclosure.

FIG. 2 depicts source code portions 200 in accordance with embodiments of the present disclosure. Source code 106 may comprise a number of source code portions. Code portions include, but are not limited to, packages, namespaces, classes, interfaces, built-in functions/methods, custom function/methods, operations, statements, data structures, comments, constants, variable names, etc., the conventions and syntaxes utilized to identify such code portions, and/or the parameters (number and/or type) of functions, operands, etc. For example, code portion 202 includes a Java package (references to external libraries stored within a related ".jar") which includes "android" functionality (e.g., for a mobile phone operating system). Computer 110, when analyzing source code 106 comprising code portion 202, may then determine that the application is for execution on target executable environment(s) 116 that are operable to execute Java, Android, or both Java and Android. As a result, tests related to other target executable environment 116, such as those executing on a different mobile platform (e.g., iOS) or a thick application (e.g., Windows on a PC) may be omitted when configuring computer 110 to perform dynamic (e.g., runtime) testing on an executable (e.g., complied, interpreted, linked) form of source code 106, namely, machine code 108. Dynamic testing may include runtime tests or, in another embodiment, utilizing Fortify when configuring computer 110 to perform static (e.g., static code analysis) testing on source code 106 (e.g., source code, configuration files, dependencies, etc.)."

Similarly, code portion 204 includes certain portions (e.g., "stdio.h" and "main") that are generally known to be operable for daemons or thick clients and not applicable to web applications, certain mobile devices, etc. As a result, such tests are excluded from the configuration of computer 110 when testing source code 106, embodied as machine code 108, having code portion 204. In another example, code portion 206 includes a certain portion (e.g., class definition extending HttpServlet). While such code portions may not be conclusive, a weighting may be utilized and, if one or more other factors that confirm the indication (e.g., a Java Web application) then non-Java tests, (e.g., buffer overflow) may be omitted from the testing of machine code 108 when the corresponding source code 106 comprises code portion 206.

Figure 3:
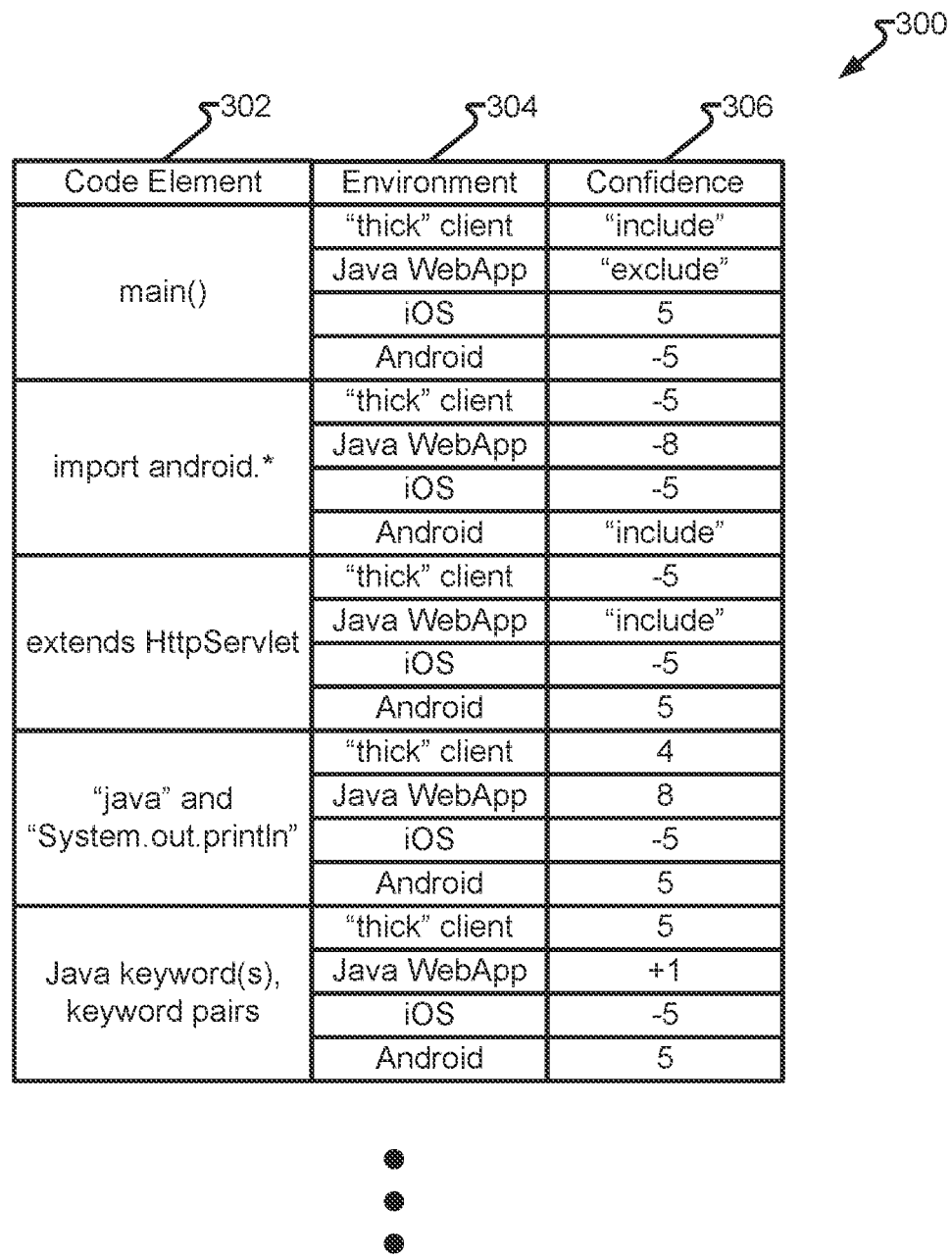
FIG. 3 depicts a data structure in accordance with embodiments of the present disclosure.

FIG. 3 depicts data structure 300 in accordance with embodiments of the present disclosure. In one embodiment, data structure 300 is maintained in a data storage devices, such as test data storage 112 and utilized to configure computer 110 for testing a particular machine code 108. Data structure 300 comprises a set of code elements 302 that, if encountered in a corresponding source code 106, indicate one or more target executable environments 116 identified in environment column 304, in for inclusion or exclusion. Additionally or optionally, confidence 306 comprises values to indicate if a particular code element, if present, conclusively determines a particular target executable environment 116 to include or exclude. It should be appreciated that variations of the layout and fields of data structure 300, other than those illustrated, are also contemplated and may be utilized without departing from the scope of the embodiments herein.

For example, when code element 302 is encountered that matches "main( )" or similar (e.g., main(void); main (argc, argv); etc.) one or more matches to environment 304 fields may be made, such as to conclude that the application comprising machine code 108 is not a Java application and/or to conclude that a thick client is provided. Such an element may be conclusive of other target executable environment 116 or may merely up weight or down weight a particular target executable environment 116. For example, it may not be a strong indicator, for or against, that such a code element is executable on a mobile device (e.g., iOS or Android). Accordingly, a value in code element 302 may be determinative of a particular target executable environment 116, provide an indication (strong to weak), or be neutral with respect to any one or more target executable environments 116 to include or exclude.

In another embodiment, code elements 302 may be rule based, such as the occurrence of two or more specific code elements may individually add or remove weight to a particular target executable environment 116, but when encountered together (e.g., same file, particular order, etc.) more strongly indicate the particular target executable environment 116. For example, the word "java" may be encountered but, absent more, only has a slight inclination to indicate a particular target executable environment 116 (e.g., Java WebApp) and/or indicate against another particular target executable environment 116 (e.g., thick client, daemon, etc.). Further encountering another term, such as a Java function call (e.g., "System.out.println") may also, by itself only indicate a slight leaning towards a Java target executable environment 116 and against a native thick client target executable environment 116. However, when encountered together in the same source code, the combination may be a stronger indication than the two code components individually.

In another embodiment, programming language-specific keywords may be encountered and increment a particular target executable environment 116, whether for or against inclusion. As will be described more completely with respect to FIG. 6, the specific code portions encountered, and the combinations of such code portions, may be applied to machine learning such as to train an artificial intelligent (AI) agent, such as a neural network, to learn which code elements and/or combinations of code elements indicate which target executable environment 116 for inclusion and/or exclusion. For example, an AI may determine that certain naming conventions, although not mandated by a particular programming language, can determine at least one target executable environment 116 to exclude. As a further option, data structure 300 may comprise references to external sources (e.g., Github.com, maven.org, etc.) or other repository of naming conventions or other elements that indicate, by themselves, or as an input to train an AI, of particular target executable environment 116 to exclude.

Figure 4:
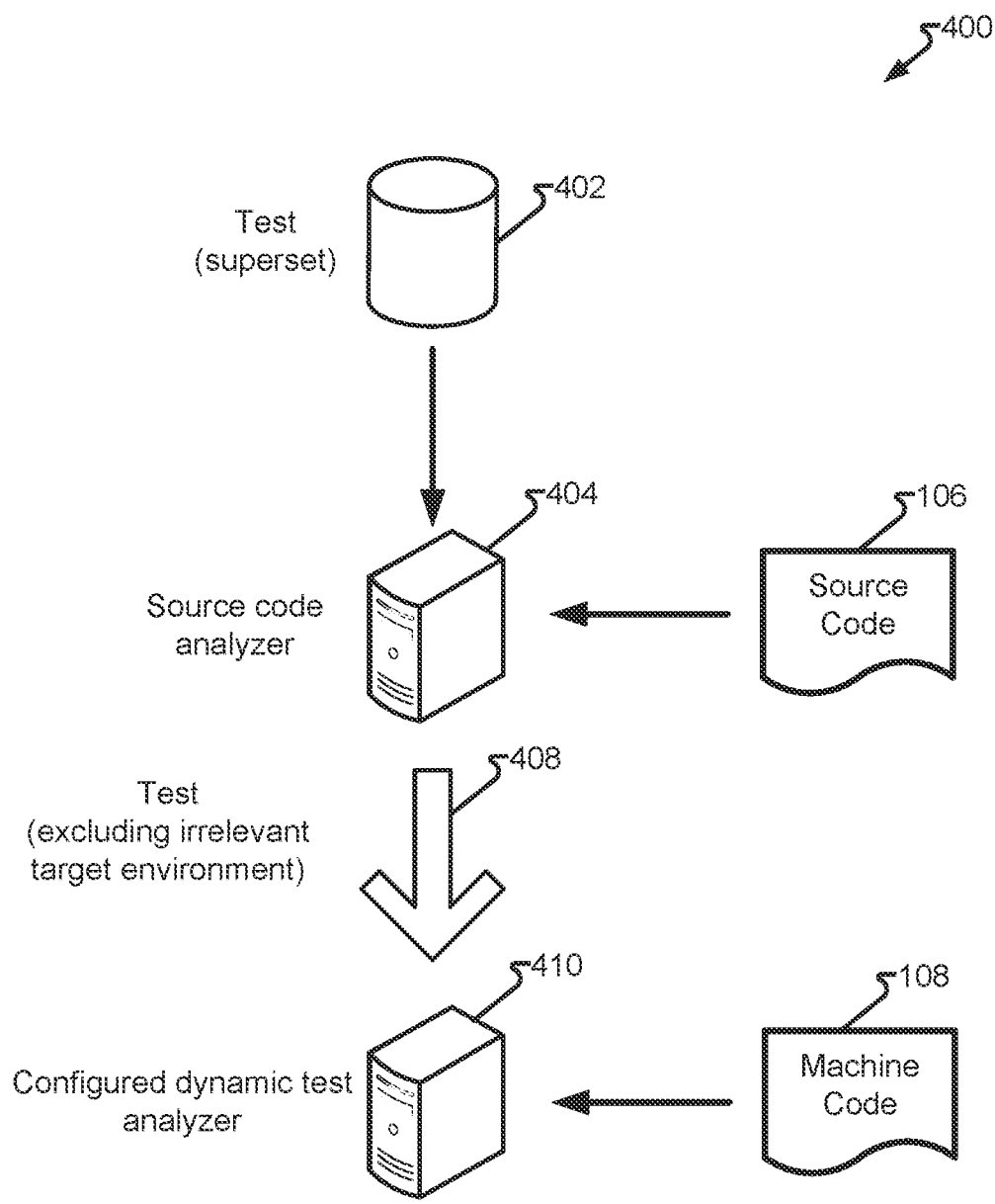
FIG. 4 depicts a second system in accordance with embodiments of the present disclosure.

FIG. 4 depicts system 400 in accordance with embodiments of the present disclosure. In one embodiment, system 400 illustrates a testing operation. Data storage 402, comprising a superset of tests, such as the tests that may be utilized to test a particular application under test (AUT) comprising the functionality of source code 106 as embodied as machine code 108, without regard to target executable environments 116 for the AUT.

Source code analyzer 404 receives tests and source code 106 and, therefrom, determines one or more target executable environment 116 that are not applicable to the resulting AUT. Configuration 408 is then loaded to, and thereby configures, dynamic testing analyzer 410 to perform the tests without performing test identified as solely relating to excluded target executable environment(s) 116. Dynamic testing analyzer 410 may then analyze machine code 108, which may be limited to a fixed number of processing cycles, time, specific events, etc.

As a further embodiment, any issues found from failed tests may be provided to an automated (e.g., AI) or manual system to be addressed. If a particular test result is determined to be non-applicable to the target executable environment(s) 116 for the AUT, such an input may be provided to the AI to train the AI to, in subsequent iterations of source code analyzer 404 analyzing subsequent interactions of source code 106, to better identify the applicable and/or non-applicable code elements and the association with one or more target executable environments 116. As a benefit, subsequent iterations of dynamic testing analyzer 410 are less likely to perform tests, and provide results, for the corrected code elements present in source code 106 more correctly identifying code elements not associated with the particular target executable environment 116 that lead to the superfluous test.

Figure 5:
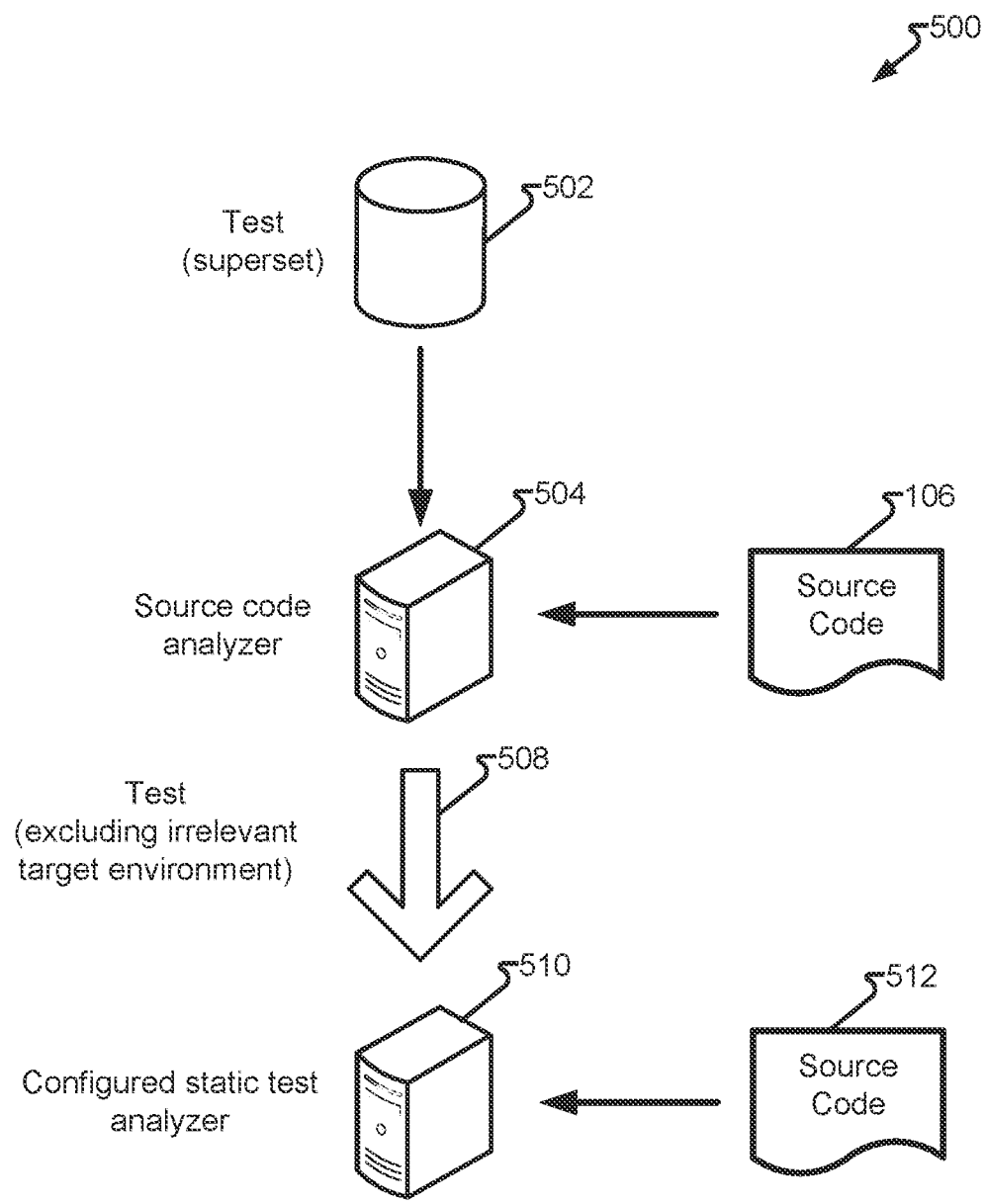
FIG. 5 depicts a third system in accordance with embodiments of the present disclosure.

FIG. 5 depicts system 500 in accordance with embodiments of the present disclosure. In one embodiment, system 500 illustrates a testing operation. Data storage 502, comprising a superset of tests, such as the tests that may be utilized to test a particular application under test (AUT) comprising the functionality of source code 106 as embodied as machine code 108, without regard to target executable environments 116 for the AUT.

In one embodiment, source code analyzer 504 accesses source code 106. Test 508 excludes tests determined to be irrelevant and/or unnecessary. Accordingly, source code analyzer trains configured static test analyzer 510 with tests to be excluded based on features learned and for only the associated target executable environment 116 to be utilized. After training, configured static test analyzer 510 accesses source code 512 and therefrom utilizes the training to automatically exclude tests that are not necessary or relevant.

Figure 6:
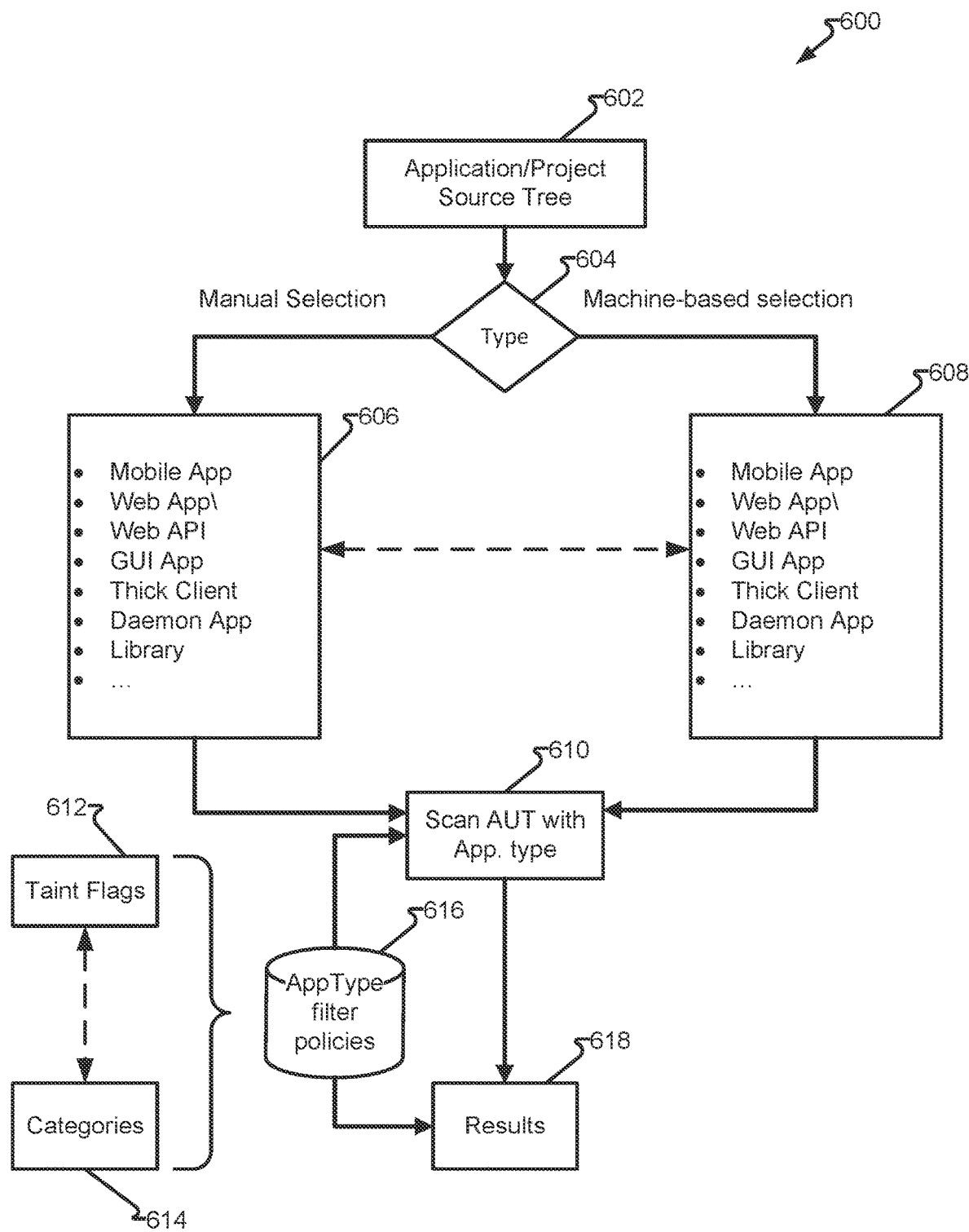
FIG. 6 depicts a first process in accordance with embodiments of the present disclosure.

FIG. 6 depicts process 600 in accordance with embodiments of the present disclosure. Process 600 begins and, in step 602, an application (e.g., AUT) is selected, which may comprise one or more source code 106 modules and/or machine code 108 modules. Step 604 determines if the analysis will be automatic or manual. If test 604 determines the test is manual, operation 606 selects one or more target executable environments 116 from an enumerated set of target executable environments. Similarly, if test 604 selects an automatic system, such as an AI, process 600 performs automatic operation 608 to select one or more target executable environments 116 from an enumerated set of target executable environments. The selection indicates the particular target executable environment(s) 116 the AUT will be deployed in/upon and/or optionally which target executable environment(s) 116 the AUT will not be deployed in/upon.

In another embodiment, a feedback means (dashed line between manual operation 606 and automatic operation 608) is provided. The results of manual operation 606 may be provided to automatic operation 608 as a means to verify and/or train the AI performing automatic operation 608. For example, the person performing manual operation 606 may not understand or accurately indicate the particular target executable environments 116 and automatic operation 208 may verify the selection (e.g., "You indicated this was a Java application, but it includes "main( )" associated with a thick client.) and/or provide a suggested change. Similarly, AI determined target executable environments 116 may be confirmed or corrected by manual input.

Additionally or alternatively, the AI performing automatic operation 608 may be trained, at least in part, based on inputs from manual operation 606. For example, the AI may comprise a neural network, which is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive. Accordingly, the AI may learn what content, or combinations of content, within source code 106 indicate which particular target executable environment 116 to include and/or exclude.

Step 610 then scans AUT with particular rules from storage 616 for the relevant, and excluding irrelevant, target executable environments 116 as selected from selection 606 or 608. Filter policies 616, as selected at least in part from the particular selection 606 or 608, may include setting taint flags 612 and/or categories 614, comprising categories of errors and/or vulnerabilities to test for. The results of the configured testing in step 610, is then provided as results 618.

Figure 7:
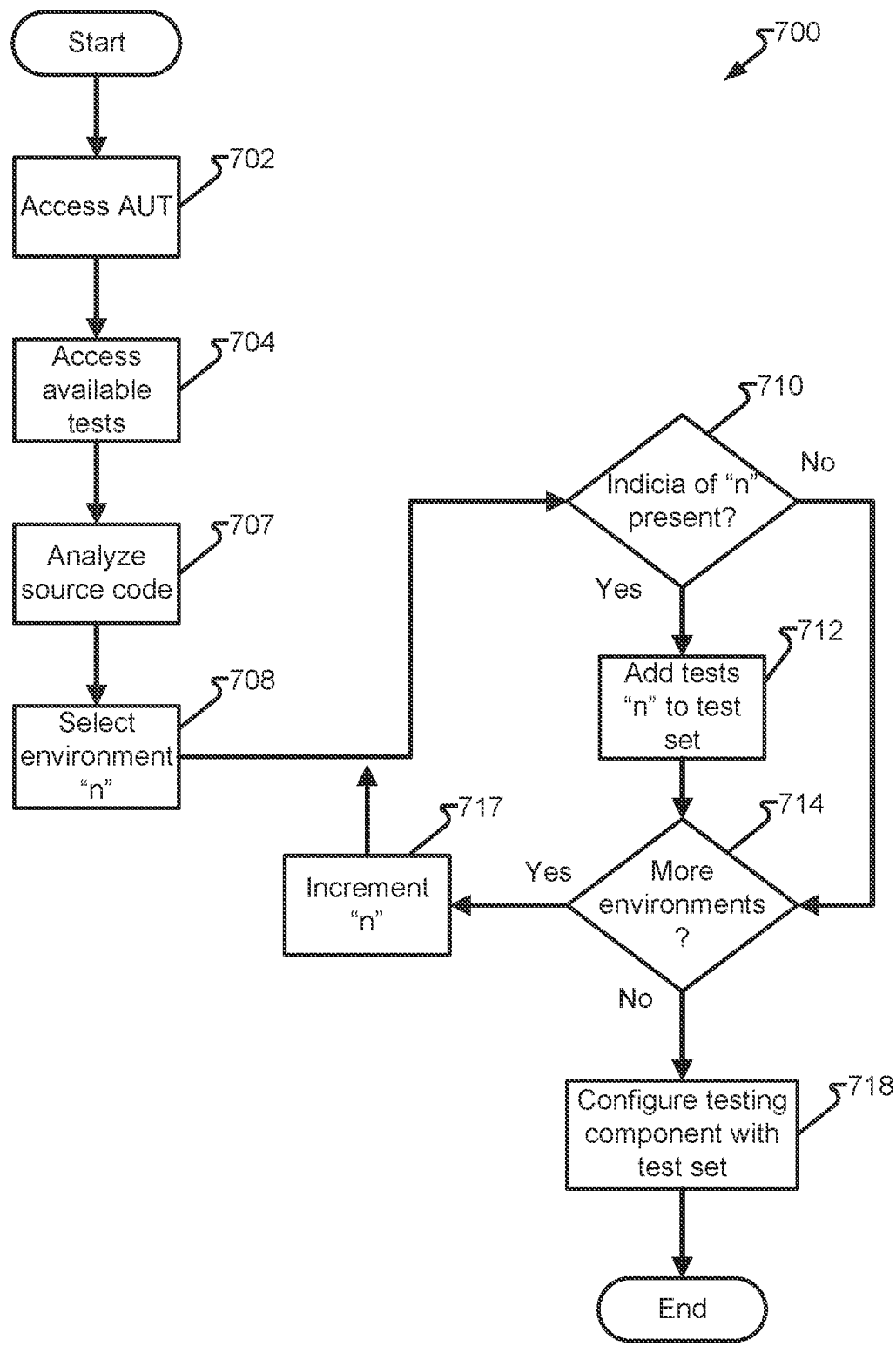
FIG. 7 depicts a second process in accordance with embodiments of the present disclosure.

FIG. 7 depicts process 700 in accordance with embodiments of the present disclosure. Process 700 may be embodied as machine-readable instructions maintained in a non-transitory storage that when read by a processor, such as a processor of computer 110, cause the processor to perform the steps of process 700. Process 700 begins and, in step 702, an AUT is accessed. The AUT comprising an associated source code 106 and counterpart embodied as machine code 108. Step 704 accesses a set of available tests to which the AUT may be subject.

Step 706 selects a number of target executable environment 116 and, in test 710 determines if a particular indicator of that target executable environment is present. If present (test 610 determined in the affirmative) processing continues to step 712 and the tests associated with the corresponding target executable environment 116 are added to a test set. If absent (test 610 is determined in the negative) processing continues to step 714 and omits step 712.

If test 714 determines there are more environments, step 716 increments to the next target executable environment 116 and continues to test 610. If test 714 is determined in the negative, processing continues to step 718 and the dynamic testing component is configured with tests of from the test set, omitting tests associated solely with unselected target executable environment 116.

Figure 8:
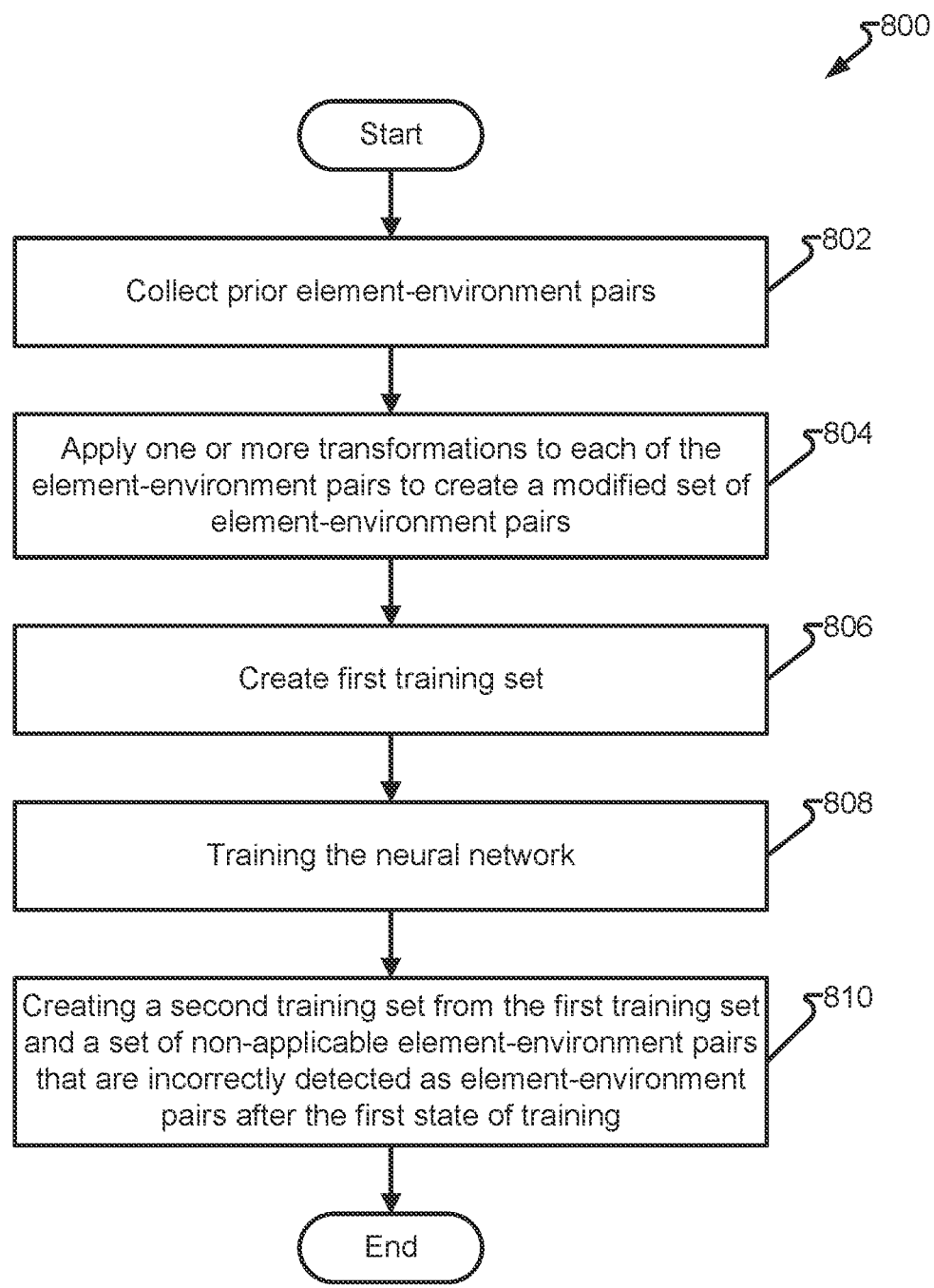
FIG. 8 depicts a third process in accordance with embodiments of the present disclosure.

FIG. 8 depicts process 800 in accordance with embodiments of the present disclosure. Process 800 may be embodied as machine-readable instructions maintained in a non-transitory storage that when read by a processor, such as a processor of computer 110, cause the processor to perform the steps of process 800. Process 800 begins and, in step 802 a collection of prior element-environment pairs is collected from a data storage. The prior element-environment pairs comprising at least one coding element (e.g., code element 302) that is known to occur in at least one source code 106 for a corresponding machine code 108 that is, or comprises, an application tested with tests specific to a particular environment (e.g., target executable environment 116).

Step 804 generates one or more transformations to each of the prior element-environment pairs comprising at least one of changing one element to a similar element having substantially the same functionality (e.g., "read" for "get"), changing a functions syntax (e.g., naming convention; the number, order, and/or datatype of parameters and/or return value(s)), changing a method of operation a function (e.g., omitting, adding, or altering a prerequisite or post-requisite function), method of operation, or included library of functions and/or changing a particular environment of a set of environments to create a modified set of element-environment pairs. In one embodiment, changing the element comprises changing an element from one form, known to be in accordance with one environment, to another form, known to be in accordance with a different environment.

Step 806 then creates a first training set from the prior element-environment pairs and the modified set of element-environment pairs and, in step 808, trains the neural network. Step 810 then creates a second training set from the first training set and a set of non-applicable element-environment pairs. For example, pairs that do not exist in any source code 106 for an application deployed on a particular target executable environment 116 (e.g., a "main( )" in an environment that is configured to only execute Java applications). The neural network may then be trained in the second training set and, once trained, be provided with at least one of a particular test and/or a particular source code element and determine an environment that will or will not apply based thereon. If the neural network determines the test is applicable, the test is kept and provided to configure the testing device (e.g., computer 110). If the neural network determines the test is not-applicable the test is removed or otherwise not include in the configuration of the testing device.

As a benefit of process 800, a system comprising a neural network may be trained to determine which tests (e.g., vulnerability attacks, validity checks, usability, errors, etc.) to be excluded based on training the neural network. Subsequent tests may then selectively remove tests to be applied to the source code 106 and/or machine code 108 when not germane (e.g., unreachable, unusable, unnecessary, etc.) to the target executable environment 116 for the application under test.

Computer 110, source code analyzer 406, and dynamic test analyzer 412 may each be configured with a processor. Each processor may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via a bus, executes instructions, and outputs data, again such as via a bus. In other embodiments, the processor(s) may comprise a shared processing device that may be utilized by other processes and/or process owners, such as in a processing array within a system (e.g., blade, multi-processor board, etc.) or distributed processing system (e.g., "cloud", farm, etc.). Additionally or alternatively, one or more of computer 110, source code analyzer 406, and dynamic test analyzer 412 may comprise a network interface to a network (e.g., LAN, WAN, Internet, etc.) to communicate with nodes thereon. Additionally or alternatively, one or more of computer 110, source code analyzer 406, and dynamic test analyzer 412 may comprise a storage device and/or a connection to a storage device, such as test data storage 112, executable storage 114, and/or tests 402. Other configured hardware may be required, for one or more embodiments, beyond those components illustrated or described as would be routine and understood by ones of ordinary skill in the art as implicitly necessary to carry-out the operations described including, but not limited to, routers, power supplies, and network interfaces.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a processor embodied as a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A computer-implemented method of training a dynamic application testing component, comprising:
   accessing an application under test (AUT);
   identifying a set of available tests associated with the AUT, wherein each test, of the set of available tests, corresponds to at least one executable environment;
   analyzing a source code corresponding to the AUT to determine at least one target executable environment of the AUT;
   determining an exclusion category comprising tests, of the set of available tests, that comprise a corresponding at least one executable environment that excludes the at least one target executable environment; and
   configuring the dynamic application testing component to test the AUT comprising tests selected from the set of available tests excluding tests that are determined to be members of the exclusion category; and
   wherein each test, of the set of available tests, corresponds to the at least one executable environment, determined by providing the test and at least one target environment to a neural network and receiving therefrom a determination identifying at least one of each test that corresponds to the at least one executable environment or each test that does not correspond to any of the at least one executable environment.

2. The method of claim 1, further comprising training the neural network, comprising:
   collecting, from a database, a set of element-environment pairs for prior applications under test, wherein an element in the set of element-environment pairs comprises at least one source code element, wherein each source code element comprises at least one of a function, a function syntax, a method of operation, or an included library of functions, and wherein an environment in the set of element-environment pairs comprises at least one executable environment for an executable form of the source code;
   applying one or more transformations to each set of element-environment pairs, including adding, removing, or changing the source code element to create a modified set of element-environment pairs;
   creating a first training set comprising the collected set of element-environment pairs, the modified set of element-environment pairs, and a set of non-applicable element-environment pairs;
   training the neural network in a first stage of training using the first training set;
   creating a second training set for a second stage of training comprising the first training set and the set of non-applicable element-environment pairs that are incorrectly detected as element-environment pairs after the first stage of training; and
   training the neural network in the second stage of training using the second training set.

3. The method of claim 2, further comprising determining the set of non-applicable element-environment pairs, comprising:
   collecting a set of prior applications under test;
   collecting a set of prior tests performed on each prior application of the set of prior applications under test;
   collecting a set of executable environments for each prior application of the set of prior applications under test;
   collecting a set of source code elements for each prior application of the set of prior applications under test;
   generating a set of element-application-environment mappings, each element-application-environment mapping comprising a source code element from the set of prior applications under test, indicia of the prior application of the set of prior applications comprising the source code element, and indicia of the executable environment of the prior application of the set of prior applications;
   determining, from the set of element-application-environment mappings, a set of elements corresponding to the executable environment; and
   adding ones of the set of element-application-environment mappings to the set of non-applicable element-environment pairs upon determining that, for element-application-environment mappings having indicia of the executable environment matching the at least one target executable environment, the source code element of the element-application-environment mappings occurred below a previously determined threshold amount.

4. The method of claim 3, wherein the previously determined threshold amount is determined in accordance with a frequency of occurrences of the source code element, of a different element-application-environment mapping, that is different from the source code element of the ones of the set of element-application-environment mappings.

5. The method of claim 3, further comprising determining the set of non-applicable element-environment pairs, comprising retrieving from a data storage indicia of non-applicable element-environment pairs.

6. The method of claim 1, wherein analyzing the source code corresponding to the AUT to determine the at least one target executable environment of the AUT, further comprises:
   accessing a record comprising determinative features for the at least one target executable environment; and
   at least one of (a) determining the at least one target executable environment of the AUT upon determining a portion of the source code matches a first record comprising determinative features wherein the record further indicates a required element of the at least one target executable environment of the AUT or (b) excluding the at least one target executable environment of the AUT upon determining the portion of the source code matches a second record comprising excluded determinative features wherein the record further indicates an excluded element of the at least one target executable environment of the AUT.

7. The method of claim 1, wherein analyzing the source code corresponding to the AUT to determine the at least one target executable environment of the AUT, further comprises analyzing an execution path of the source code.

8. The method of claim 1, further comprising executing the dynamic application testing component to test the AUT comprising the tests selected from the set of available tests excluding the tests that are determined to be members of the exclusion category.

9. The method of claim 1, wherein the at least one target executable environment comprises components operable to execute the AUT comprising at least one of an operating system, at least one of a host-client pair, each executing at least a portion of the AUT, a distributed system, each executing a portion of the AUT, a processor instruction set, a communication protocol, or a computing architecture.

10. A system for training a component, comprising:
a processor comprising at least one microprocessor having instructions maintained in a non-transitory medium that cause the processor to:
identify, from a data structure, a set of available tests associated with an application under test (AUT), wherein each test, of the set of available tests, corresponds to at least one executable environment;
analyze a source code corresponding to the AUT to determine at least one target executable environment of the AUT;
determine an exclusion category comprising tests, of the set of available tests, that comprise a corresponding at least one executable environment that excludes the at least one target executable environment; and
configure the component to test the AUT comprising tests selected from the set of available tests excluding tests that are determined to be members of the exclusion category; and
wherein each test, of the set of available tests, corresponds to the at least one executable environment, determined by providing the test and at least one target environment to the processor executing a neural network and receiving therefrom a determination identifying at least one of each test that corresponds to the at least one executable environment or each test that does not correspond to any of the at least one executable environment.

11. The system of claim 10, further comprising the processor training the neural network, comprising:
collecting, from a database, a set of element-environment pairs for prior applications under test, wherein an element in the set of element-environment pairs comprises at least one source code element, wherein each source code element comprises at least one of a function, a function syntax, a method of operation, or an included library of functions, and wherein an environment in the set of element-environment pairs comprises at least one executable environment for an executable form of the source code;
applying one or more transformations to each set of element-environment pairs, including adding, removing, or changing the source code element to create a modified set of element-environment pairs;
creating a first training set comprising the collected set of element-environment pairs, the modified set of element-environment pairs, and a set of non-applicable element-environment pairs;
training the neural network in a first stage of training using the first training set;
creating a second training set for a second stage of training comprising the first training set and the set of non-applicable element-environment pairs that are incorrectly detected as element-environment pairs after the first stage of training; and
training the neural network in the second stage of training using the second training set.

12. The system of claim 11, wherein the processor determines the set of non-applicable element-environment pairs, comprising:
collecting a set of prior applications under test;
collecting a set of prior tests performed on each of the set of prior applications under test;
collecting a set of executable environments for each prior application of the set of prior applications under test;
collecting a set of source code elements for each prior application of the set of prior applications under test;
generating a set of element-application-environment mappings, each element-application-environment mapping comprising a source code element from the set of prior applications under test, indicia of the prior application of the set of prior applications comprising the source code element, and indicia of the executable environment of the prior application of the set of prior applications;
determining, from the set of element-application-environment mappings, a set of elements corresponding to the executable environment; and
adding ones of the set of element-application-environment mappings to the set of non-applicable element-environment pairs upon determining that, for element-application-environment mappings having indicia of the executable environment matching the at least one target executable environment, the source code element of the element-application-environment mappings occurred below a previously determined threshold amount.

13. The system of claim 12, wherein the previously determined threshold amount is determined in accordance with a frequency of occurrences of the source code element, of a different element-application-environment mapping, that is different from the source code element of the ones of the set of element-application-environment mappings.

14. The system of claim 11, further comprising the processor determining the set of non-applicable element-environment pairs, comprising retrieving from a data storage indicia of non-applicable element-environment pairs.

15. The system of claim 10, wherein analyzing the source code corresponding to the AUT to determine the at least one target executable environment of the AUT, further comprises the processor:
accessing a record comprising determinative features for the at least one target executable environment; and
at least one of (a) determining the at least one target executable environment of the AUT upon determining a portion of the source code matches a first record comprising determinative features wherein the record further indicates a required element of the at least one target executable environment of the AUT or (b) excluding the at least one target executable environment of the AUT upon determining the portion of the source code matches a second record comprising excluded determinative features wherein the record further indicates an excluded element of the at least one target executable environment of the AUT.

16. The system of claim 10, wherein analyzing the source code corresponding to the AUT to determine the at least one target executable environment of the AUT, further comprises the processor analyzing an execution path of the source code.

17. The system of claim 10, further comprising the processor executing the component to test the AUT comprising the tests selected from the set of available tests excluding the tests that are determined to be members of the exclusion category.

18. A system having non-transitory computer readable storage medium storing computer instructions and comprising:

instructions to identify, from a data structure in a data storage, a set of available tests associated with an application under test (AUT), wherein each test, of the set of available tests, corresponds to at least one executable environment;

instructions to automatically analyze a source code corresponding to the AUT to determine at least one target executable environment of the AUT;

instructions to determine an exclusion category comprising tests, of the set of available tests, that comprise a corresponding at least one executable environment that excludes the at least one target executable environment; and instructions to configure a testing component to test the AUT comprising tests selected from the set of available tests excluding tests that are determined to be members of the exclusion category; and wherein each test, of the set of available tests, corresponds to the at least one executable environment, determined by providing the test and at least one target environment to a neural network and receiving therefrom a determination identifying at least one of each test that corresponds to the at least one executable environment or each test that does not correspond to any of the at least one executable environment.

19. The system of claim 18, wherein the instructions to automatically analyze the source code corresponding to the AUT to determine the at least one target executable environment of the AUT, further comprises instructions to analyze an execution path of the source code.

20. The system of claim 18, further comprising instructions to execute the testing component to test the AUT comprising the tests selected from the set of available tests excluding the tests that are determined to be members of the exclusion category.

* * * * *